March 31, 1970  T. S. MOULTON  3,503,556
SPRINKLER POWER MOVER UNIT

Filed Jan. 12, 1968  5 Sheets-Sheet 1

INVENTOR
THOMAS S. MOULTON
BY
ATTORNEY

March 31, 1970  T. S. MOULTON  3,503,556
SPRINKLER POWER MOVER UNIT
Filed Jan. 12, 1968  5 Sheets-Sheet 2
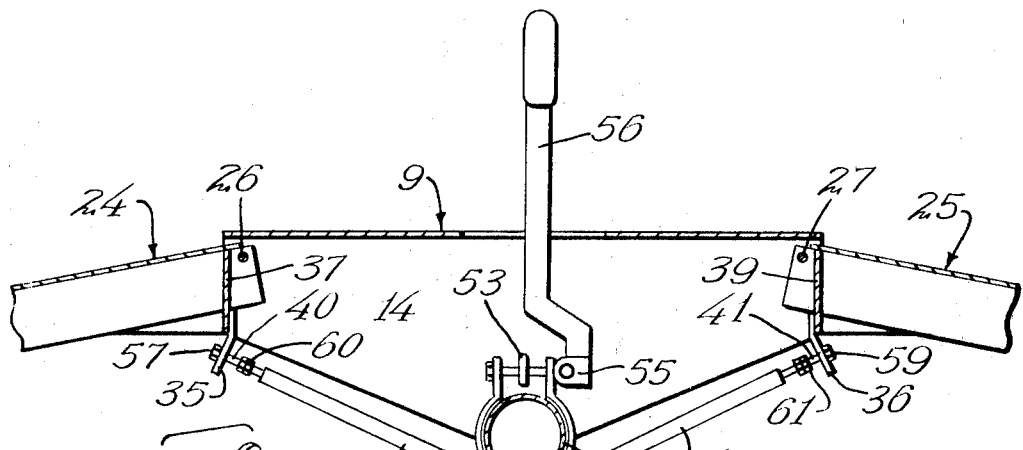
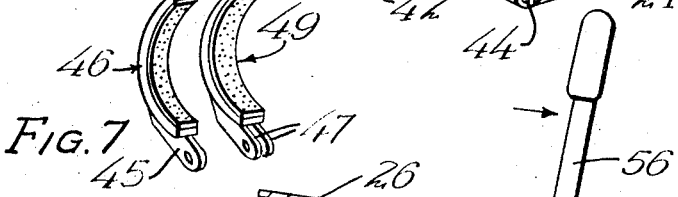
INVENTOR
THOMAS S. MOULTON
BY Robert M. Dunning
ATTORNEY March 31, 1970     T. S. MOULTON     3,503,556
SPRINKLER POWER MOVER UNIT Filed Jan. 12, 1968     5 Sheets-Sheet 3

INVENTOR
THOMAS S. MOULTON
BY *[signature]*
ATTORNEY

March 31, 1970  T. S. MOULTON  3,503,556
SPRINKLER POWER MOVER UNIT

Filed Jan. 12, 1968  5 Sheets-Sheet 4

INVENTOR
THOMAS S. MOULTON
BY Robert M. Dunning
ATTORNEY

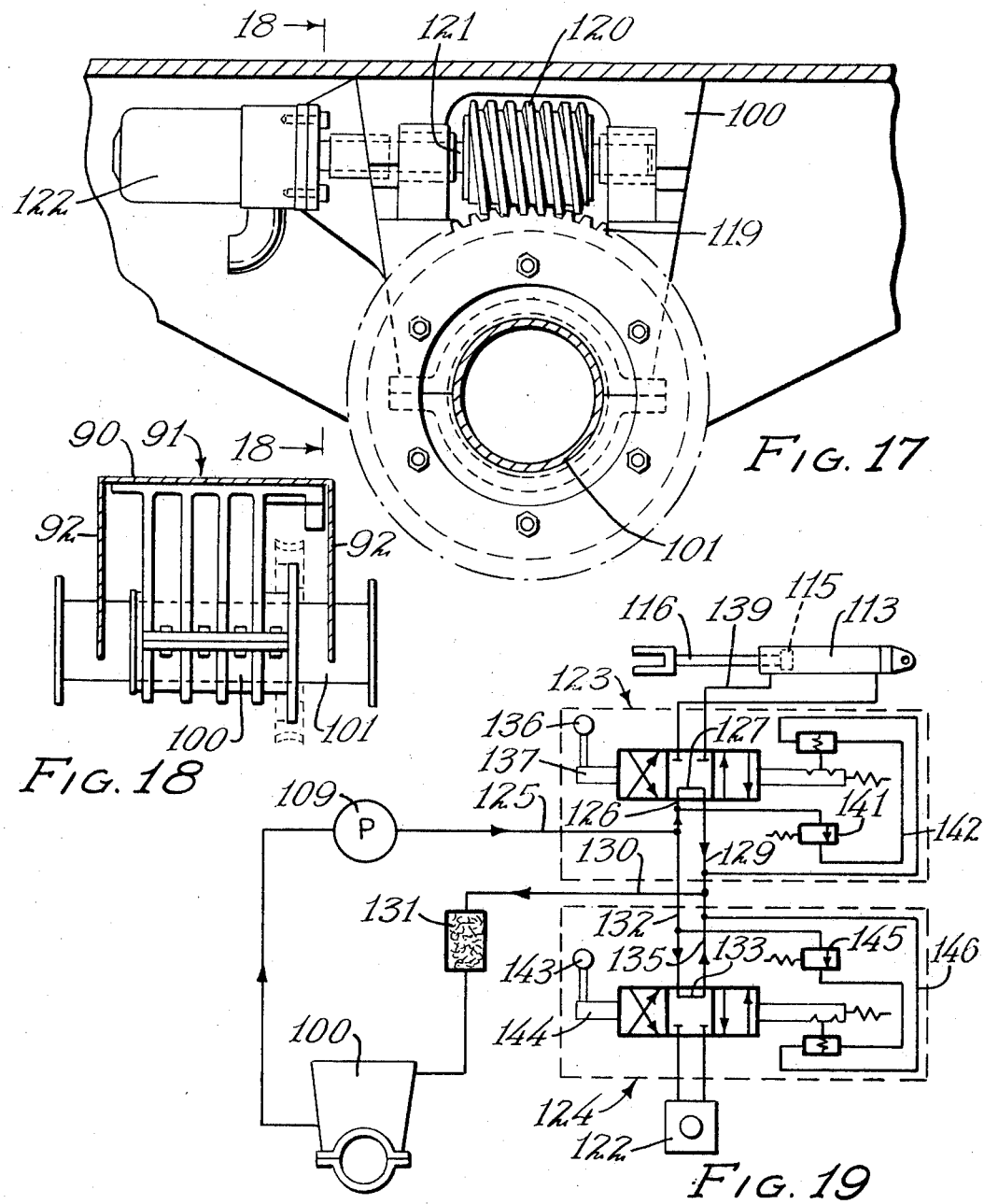

United States Patent Office 3,503,556
Patented Mar. 31, 1970

3,503,556
SPRINKLER POWER MOVER UNIT
Thomas S. Moulton, Somerset, Wis. 54025
Filed Jan. 12, 1968, Ser. No. 697,515
Int. Cl. A01g 25/00
U.S. Cl. 239—212                                   10 Claims

ABSTRACT OF THE DISCLOSURE

The invention lies in a sprinkler power mover unit for use in combination with an irrigating system in which water is forced through a series of pipe sections coupled together in end to end relation, with concentric wheels supporting the sections, to spaced sprinkler heads. A carriage having guide wheels arranged in tandem supports an engine for rotating the pipe in either direction. Ground engaging wheel means concentric with the pipe propel the carriage. Means is provided for elevating the ground engaging wheel means out of contact with the ground so that the pipe may be rotated while the carriage remains stationary, to straighten out the pipe relative to the carriage.

---

This invenion relates to an improvement in sprinkler power mover unit and deals particularly with a means of moving an irrigation sprinkler system of a particular type.

During recent years irrigation systems have been produced which comprise a series of lengths of pipe coupled together in end-to-end relation, each section being supported by a large diameter wheel mounted coaxially with the pipe. The pipe is moved over the ground by a power mover unit which may be mounted at one end of the pipe, or may be mounted intermediate the ends thereof. Sprinkler heads are provided on the pipe, and are usually located at the couplers intermediate the supporting wheels. Water is forced through the pipe and through the sprinkler heads, irrigating a large area at a single time. The pipes providing the sprinkling system may total a quarter of a mile to a half-mile in length.

One of the biggest difficulties which is experienced with systems of this type lies in the fact that the free end or ends of the pipe tend to lag somewhat behind the power mover unit when the system moves over flat ground. This difficulty is accentuated if the free end or ends of the pipe are moving up a slight rise. Similarly, there is a tendency for the free end or ends of the pipe to move ahead of the power mover unit if the ends of the pipe are traveling down a slight grade. When one or both of the ends of the pipe are either behind or in front of the drive power unit, the mover unit tends to change direction. This is particularly true where the power drive unit is at one end of the pipe. The power drive unit is at right angles to the adjoining length pipe so that the lagging or advancing of the pipe end tends to turn the drive unit out of a straight line path.

Sprinkler systems of the type in question are normally driven by a power mover which includes a carriage provided with ground engaging wheels supported forwardly and rearwardly of the pipe, and includes a motor mounted on the carriage which acts through suitable gear reduction means to rotate the pipe. Usually the wheels which are mounted at opposite ends of the carriage are driven by the engine and the pipe and wheels are rotated at a slow rate of speed by the engine. The wheels which support the pipe are usually four or five feet in diameter. Accordingly, rotation of the pipe four or five revolutions will move the pipe 50 or 60 feet along the ground to a new position. The water source is then connected to the pipe at the new location and the water is forced through the pipe to the various sprinkler heads which then sprinkle the area covered by the sprinklers.

In view of the fact that the sprinkler system is often used to sprinkle crops which are arranged in rows, it is quite essential that the sprinkler pipe system remain as straight as possible to prevent the various wheels from injuring the plants. This is often somewhat difficult where the pipe is perhaps a quarter of a mile long, and in the past, adjustments have usually been manually made. In other words, in many instances, the pipe has been disconnected from the drive mechanism and the drive mechanism has been moved to a position where it is substantially aligned with the free end of the pipe. This is obviously time consuming and often requires considerable effort on the part of the operator.

I have found that a much simpler manner of straightening the sprinkler pipe can be accomplished if the pipe is moved mechanically relative to the mover unit while the mover unit remains stationary. This may be accomplished by eliminating the drive chains from the motor to the wheels of the carriage which are forwardly and rearwardly of the sprinkler pipe, providing drive wheels coaxial with the pipe on either side of the drive unit, and providing a means of disengaging these drive wheels from the surface of the ground. The drive wheels are mounted coaxially with the pipe so that to drive the sprinkler pipe over the ground, it is only necessary for the engine to rotate the pipe. By then providing means for lifting the drive wheels out of contact with the ground, the pipe may be rotated while the carriage supporting the motor remains stationary. In the event the end of the sprinkler pipe most remote from the motor power unit lags behind the position of the motor power unit, the carriage drive wheels may be lifted out of contact with the ground, and the pipe may be rotated until the free end thereof catches up with the position of the drive unit. In the event the free end of the pipe rolls ahead of the position of the drive unit, it is only necessary to rotate the pipe in a reverse direction until the pipe has substantially aligned with the drive unit.

It will be noted that with the arrangement described, the free end of the pipe may be maintained virtually aligned with the drive unit, thus causing the pipe supporting wheels to travel in a substantially straight path. As the sprinkler is moved over the ground, movement of the drive power mover unit may be stopped momentarily and the pipe rotated in the proper position to return the pipe to a substantially straight line, accordingly causing the pipe supporting wheels to also travel in substantially straight parallel lines.

A feature of the present invention resides in the provision of a device of the type described capable of lifting the drive wheels which are on either side of the carriage out of contact with the ground so that continued rotation of the sprinkler pipe will move the free end of the pipe without moving the drive power unit until the pipe is substantially aligned. This may be accomplished by a simple and effective mechanism which may employ the power of the driving engine to disengage the drive wheels from the ground.

A further feature of the present invention resides in the provision of the type described which may employ a carriage on which the drive motor and mechanism is mounted, and which is supported between a pair of drive wheels secured to the pipe in coaxial relation thereto. A pair of yokes are a part of the carriage, one yoke extending rearwardly therefrom, and the other yoke extending forwardly therefrom. These yokes support a pair of wheels in tandem relation for use in guiding the pipe over the ground. The yokes are pivotally mounted to the remainder of the carriage. By shortening the distance between the guidewheels supported by the yokes, the drive wheels on either side of the carriage may be lifted out of contact with the ground, permitting rotation of the pipe while the drive wheels on either side of the carriage remain stationary with respect to the ground, these wheels rotating with the pipe, but being out of contact with the surface of the ground.

These and other objects and novel features of the present invention will be more clearly and fully set forth in the following specification and claims.

In the drawings forming a part of the specification:

FIGURE 6 is a diagrammatic sectional view showing a means of raising the drive wheels out of contact with the ground.

FIGURE 7 is a perspective view of the brake sections used in conjunction with the apparatus indicated in FIGURE 6.

FIGURE 8 is a view similar to FIGURE 7 after the brake shoes have been applied to the pipe momentarily.

FIGURE 9 is an enlarged elevation view of the operating apparatus indicated in FIGURE 8.

FIGURE 10 is a sectional view through the brake shoe operating mechanism, the position of the section being indicated by line 10—10 of FIGURE 9.

FIGURE 17 is an enlarged vertical sectional view showing the wheel drive mechanism.

FIGURE 18 is a sectional detail showing the axle support.

FIGURE 19 is a diagrammatic view of the hydraulic system of the apparatus.

Figure 11:
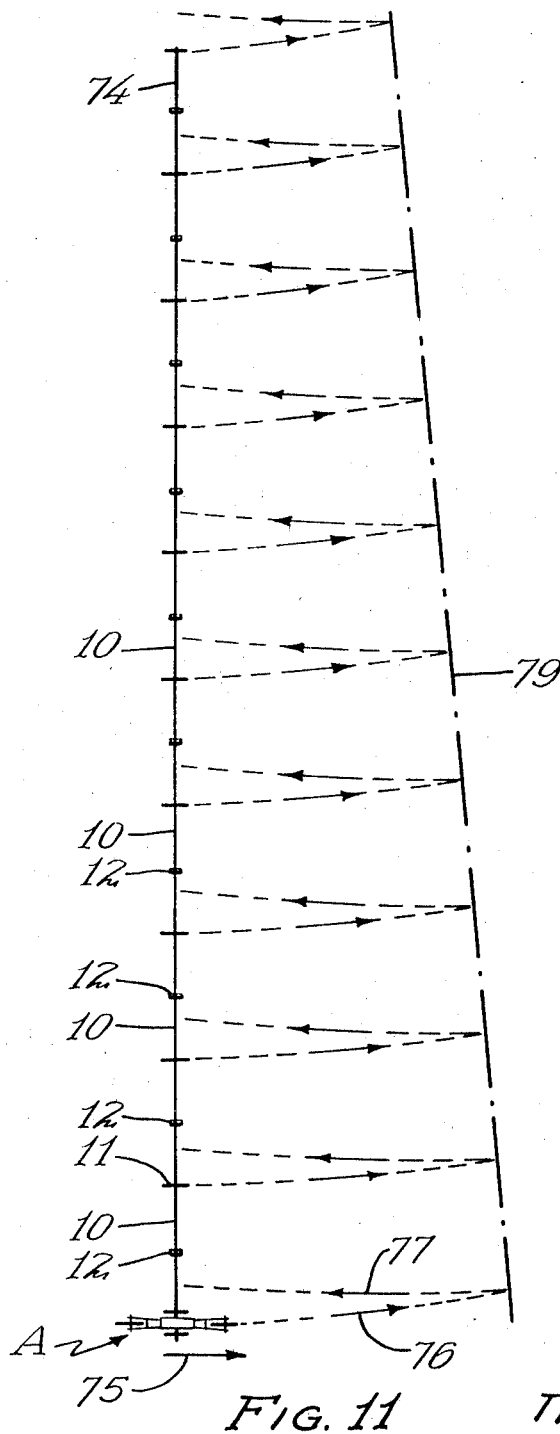
FIGURE 11 is a diagrammatic view showing the manner in which a sprinkler system of the type in question normally operates in a crooked path.
Figure 12:
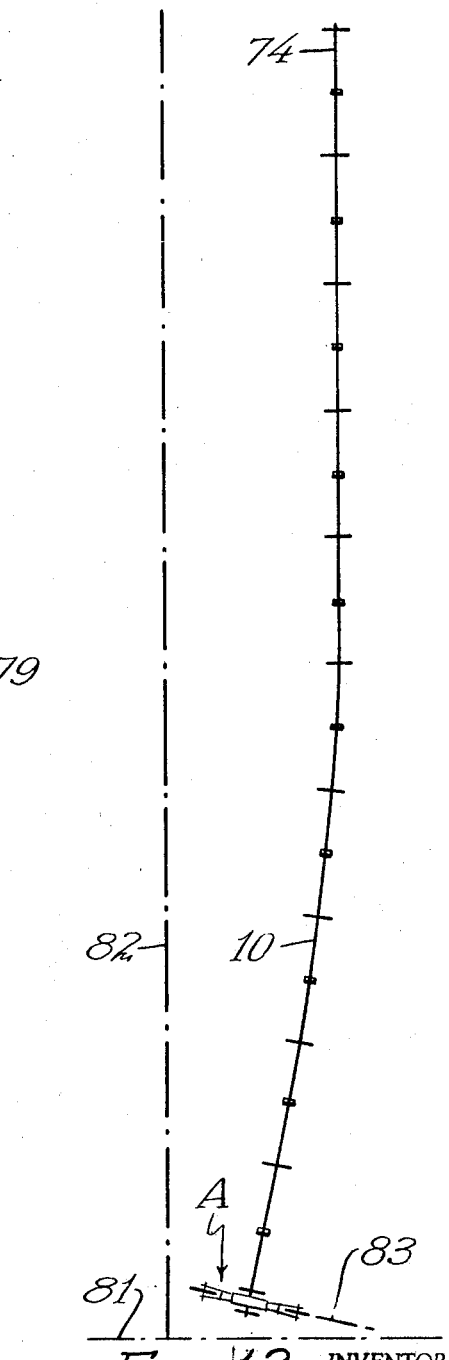
FIGURE 12 is a diagrammatic view showing the manner in which the applicant's apparatus functions.
Figure 13:
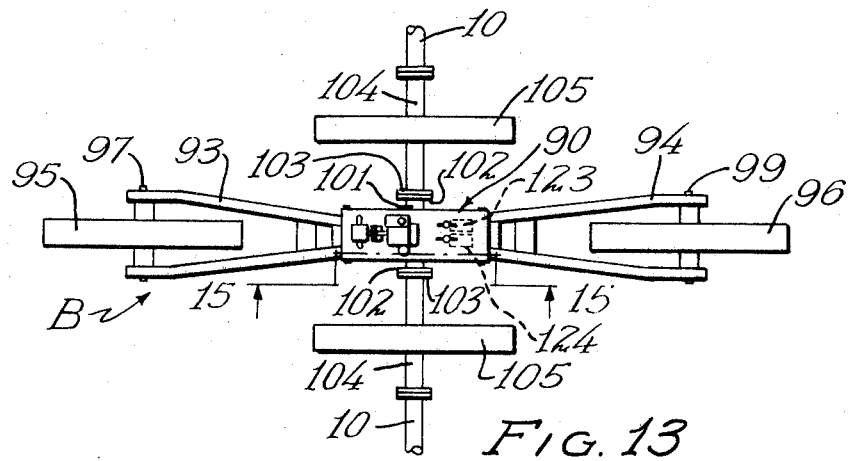
FIGURE 13 is a top plan view of a modified form of power mover unit.
Figure 14:
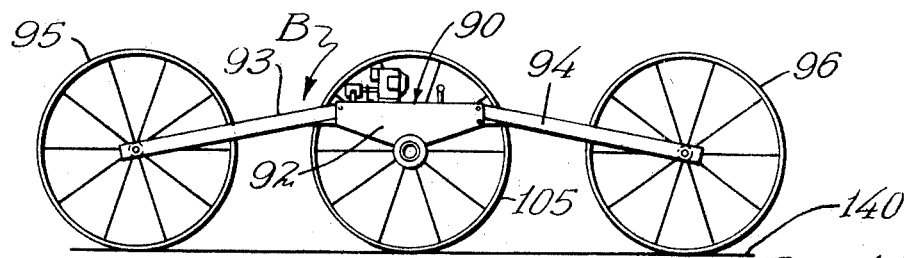
FIGURE 14 is a side elevational view of the unit illustrated in FIGURE 13.
Figure 15:
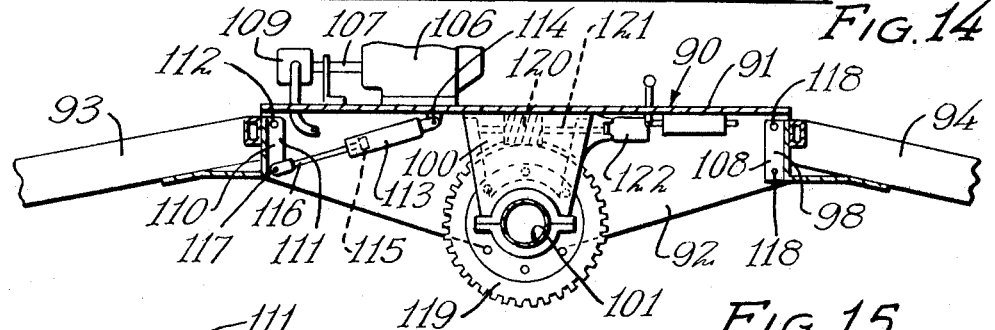
FIGURE 15 is a vertical sectional view through the power mover unit the position of the section being illustrated by the line 15—15 of FIGURE 13.
Figure 16:
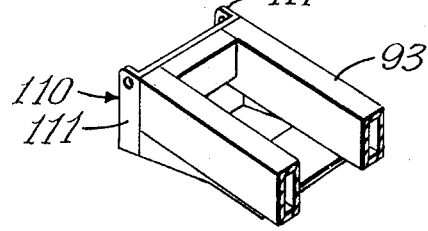
FIGURE 16 is a fragmentary perspective view through an end portion of one of the wheel supporting frames.

The present apparatus is shown somewhat diagrammatically, first for the reason that the detailed construction of the device is relatively unimportant, and secondly because the sprinkler system may be one-quarter to one-half a mile in length and accordingly cannot be shown in exact proportion in the patent drawings. With reference first to FIGURES 11 and 12 of the drawings, sprinkler systems of the type described include a series of pipe usually near the center point thereof. The lengths of pipe are connected by suitable couplers 12 capable of transmitting torque from one pipe section to the next. A power mover unit which is indicated in general by the letter A is usually provided near one end of the sprinkler pipe for moving the pipe along the ground. In some instances, the power mover unit is mounted intermediate the ends of the sprinkler pipe. A source of water, not illustrated in the drawings, is connected to the pipe to flow through the pipe throughout its length. Sprinkler heads are connected to the pipe lengths 10 to communicate with the interior thereof, and through which the water may be forced to irrigate the area encircling the sprinkler heads. The water is usually pumped under pressure by a suitable pumping system capable of lifting fluid from a supply source and forcing it through the pipe with sufficient pressure to accomplish the desired result. The water supply is usually connected either to the end of the pipe or to a T connection at the center of the pipe, if the power mover unit is located intermediate the ends of the sprinkler pipe. The pipe lengths are also usually provided with automatic dump valves, not illustrated, which open when the water pressure drops to zero to permit the water in the pipe to drain before the system is moved.

As shown in the drawings, the power mover unit A includes a platform 9 of inverted channel-shaped form, the platform including a top panel 13 and depending side flanges 14. The top panel 13 supports a suitable drive motor 15 which may be used to drive the apparatus over the ground. In the arrangement illustrated, the drive motor 15 rotates a pump 16 which pumps hydraulic fluid to a fluid motor 17. The fluid motor 17 acts through a chain or belt 19 to drive a sprocket 20 which is connected to the carriage pipe section 22 and the intermediate pipe section 21 are provided with cooperable flanges 23 which are bolted or otherwise secured together. The pipe sections 10 are also usually connected to flanges, these flanges being a part of the couplers 12. The couplers 12 often incorporate a radially extending threaded opening which supports the sprinkler heads in communication with the interior of the pipe sections. The couplers 12 also usually incorporate dump valves.

Figure 1:
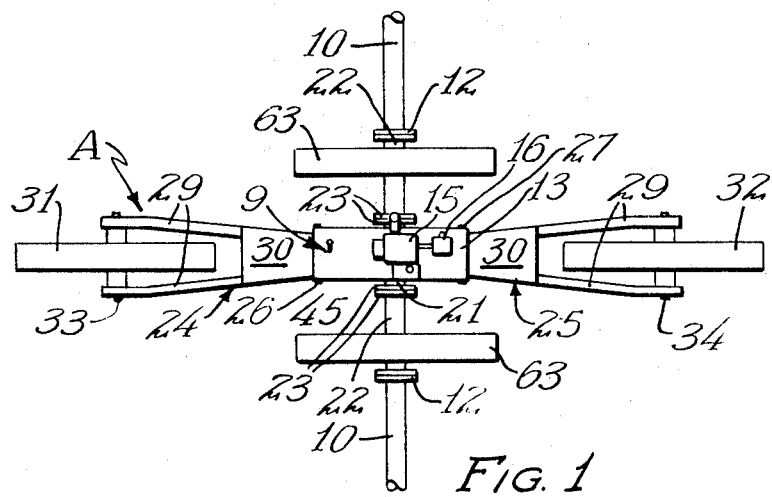
FIGURE 1 is a top plan view of the power mover unit showing the general arrangement of parts therein.
Figure 2:
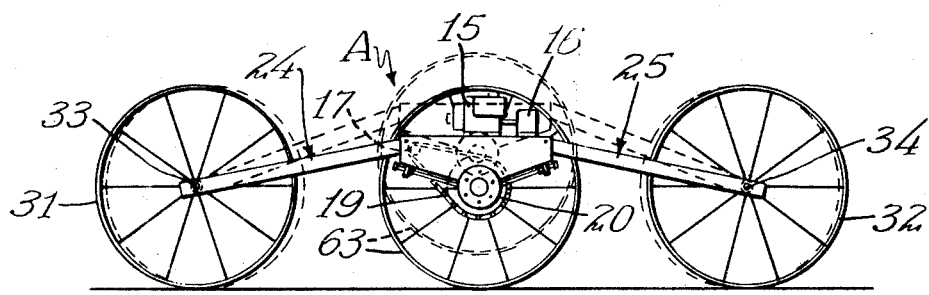
FIGURE 2 is a side elevational view of the structure shown in FIGURE 1.
Figures 3, 4:
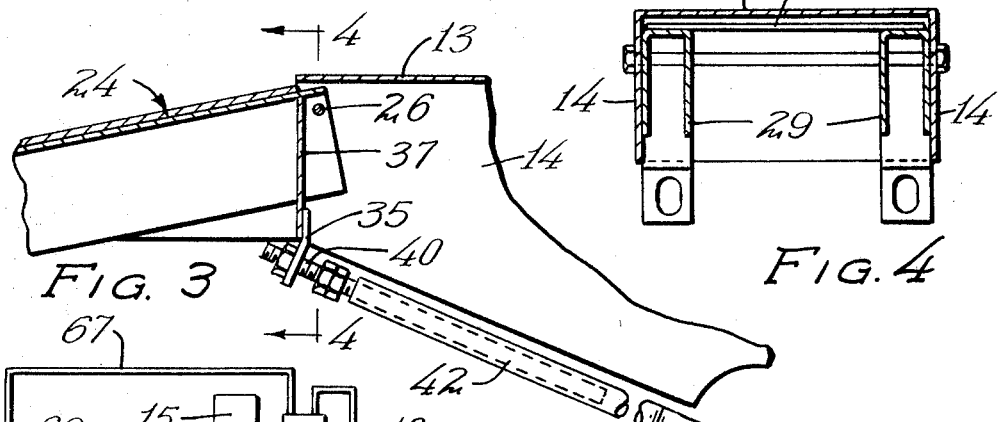
FIGURE 3 is a vertical detail section of a portion of the connection between the body of the carriage and one of the wheels supporting the yoke.
FIGURE 4 is a sectional view, the position of the section being indicated by the line 4—4 of FIGURE 3.

A pair of yokes or wheel supporting frames 24 and 25 are pivotally connected by aligned pivot shafts 26 and 27 respectively to the sides 14 of the platform mover. The wheel supporting frames 24 and 25 may be of similar construction, each including a pair of arms 29 which diverge from their pivotal connection 26 or 27 with the carriage platform. As indicated in FIGURE 4 of the drawings, the arms 29 are formed of inverted channel-shaped beams which are connected near their pivotal end by a suitable gusset plate 30. Guide wheels 31 and 32 are pivotally supported upon aligned parallel axes 33 and 34 to the frames or wheel supporting frames 24 and 25. The wheel supporting frames support the wheels 31 and 32 in tandem arrangement.

As is illustrated in FIGURES 3, 4, 6, and 8 of the drawings, a pair of lugs 35 and 36 are connected to plates 37 and 39 connected to the yokes 24 and 25. The lugs 35 and 36 slidably accommodate bolts 40 and 41 which are threaded into the ends of operating arms 42 and 43 respectively. The inner ends of the arms 43 are pivotally connected as indicated at 44. The pivot 44 extends through the ends of the rods 42 and 43, and also through a lug 45 of a brake shoe 46, and a cooperable bifurcated end 47 of a brake shoe 49 (see FIGURE 7). The brake shoes 46 and 49 encircle the center pipe section 21, and are provided with projecting ears 50 and 51 respectively which are apertured to accommodate a rod 52. The rod 52 extends through a fixed lug 53 on a side flange 14 of the body portion 9, and the end of the rod 52 supports an adjustable pivot 54 mounted in the bifurcated end 55 of a control lever 56. The bifurcated end 55 of the lever 56 is camshaped as indicated in FIGURE 9 of the drawings, so that when the control lever 56 is in the position shown in FIGURE 9 of the drawings, the lugs 50 and 51 will be sufficiently spread so that the brake shoes will slide freely of the pipe section 21. When pivoted slightly to either side of the position shown in FIGURE 9, the brake shoes will be clamped together with a force sufficient to tend to cause rotation of the brake shoes with the pipe section 21.

As will be noted in the drawings, the heads 57 and 59 of the bolts 40 and 41 respectively engage the outer surfaces of the lugs 35 and 36 to limit pivotal movement of the yokes 24 and 25 relative to the body of the carriage. Each of these bolts is also equipped with adjustment nuts 60 and 61 which are designed to engage the inner opposed surfaces of the lugs 35 and 36. When the brake shoes 46, 49 are tightened about the pipe section 21, the rotation of the pipe will cause a corresponding rotation of the brake shoes. This action exerts a pulling force on one of the operating rods. For example, when the pipe is driving in the direction of the arrow 62 shown in FIGURE 8 of the drawings, rotation of the brake shoes creates a pulling action upon the rod 42. This causes the body of the carriage to tilt in the manner illustrated in FIGURE 8 of the drawings, swinging the yoke 14 in a counter-clockwise direction as viewed and bringing the axes 33 and 34 of the wheels 31 and 32 somewhat closer together, causing the pipe section 21 to be lifted upwardly. As the pipe section 21 is lifted upwardly, the drive wheels 63 are raised upwardly out of contact with the ground. The lug 53 regulates the amount to which the brake shoes may pivot. When the lug 50 or 51 of a brake shoe 46 or 49 engages the lug 53, further rotation of the brake shoes is prevented, and the pipe section 21 merely pivots within the brake shoes until the pressure clamping the brake is released.

It will be noted that in normal practice the heads 57 and 59 of the bolts 40 and 41 are spaced a distance from the nuts 60 and 61 to permit the yokes 24 and 25 to pivot somewhat relative to the body of the carriage. With this arrangement, the tandem wheels 31 and 32 may travel over the ground even though it is not exactly level.

Figure 5:
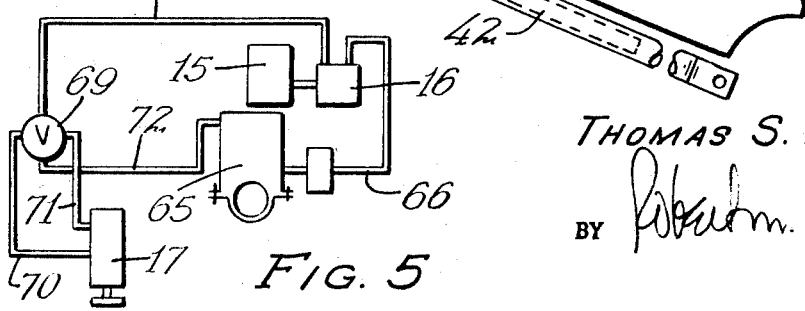
FIGURE 5 is a diagrammatic view of the hydraulic system driving the apparatus.

FIGURE 5 of the drawings diagrammatically illustrates the hydraulic system used for driving the pipe. The motor 15 is shown driving the pump 16. Hydraulic fluid from a reservoir 65 is drawn through the conduit 66 leading to the pump 16 from which it is forced under pressure through the conduit 67 to a control valve 69. The control valve 69 is connected by a pair of conduits 70 and 71 to the fluid motor 17. The valve 69 is also connected by the conduit 72 back to the reservoir 65. The arrangement is such that the valve 69 may be moved into position to direct the flow of fluid under pressure from the conduit 67 to the conduit 70, the conduit 71 then being connected to the valve 69 to the return conduit 72. Similarly, when the valve 69 directs fluid to the conduit 71, the conduit 70 acts as a return line and is connected to the conduit 72. When the conduit 70 is under pressure, the fluid motor 17 will rotate in one direction, while when the fluid under pressure is flowing through the conduit 71, the fluid motor 17 will rotate in the opposite direction. In an intermediate position of the valve, the fluid is forced directly through the valve 69 to return line 72.

FIGURE 11 of the drawings indicated diagrammatically what takes place with sprinkler systems of previous types when the free end of the sprinkler pipe does not travel the same distance as the driven end thereof. In the particular view illustrated, the free end of the pipe is indicated by the numeral 74, and this free end is lagging behind the driven end thereof on which the mover A is attached. As the mover A moves along the ground, the free end tends to lag behind the driven end of the pipe, tending to swing the mover A about a radius. Actually, the pipeline usually curves to some extent, but having the free end of the pipe trail from the direction of the arrow 75 to the direction of the broken line 76.

In the past to correct this difficulty, the pipe is permitted to pivot relative to the drive unit, by suitable disconnecting means. The drive unit and carriage may then be moved rearwardly to straighten the pipe. However, rather than to move along the path of the broken line 76, the driving unit tends to return along the broken line 77. As a result, when the pipe is substantially straight and parallel to the full line position shown in FIGURE 11, the mover A is now in a position laterally offset from its original line of motion. This is caused by the fact that the wheels at the free end of the pipe act to serve as the fulcrum point, and any misalignment of the free end of the pipe causes a misalignment of the driver unit.

It should be understood that FIGURE 11 as well as FIGURE 12 are exaggerated in form due to the size of the apparatus in question. However, the figures are believed to illustrate the principle involved.

With respect to FIGURE 12 of the drawings, a condition is provided in which the free end 74 of the pipe has traveled ahead of the driver unit A. Actually, it makes no difference whether the free end 74 is ahead or to the rear of the driver unit A in the operation of the apparatus. If the free end 74 tends to move ahead of the drive unit A, the wheels of the drive unit are lifted above the surface of the ground, and the rotation of the pipelines 10 are reversed. This causes the free end of the pipe to move rearwardly until it is aligned with the pipe lengths near the drive unit. With this arrangement, when the pipe is parallel to its original position, the drive unit while disconnected from rotation with the pipe serves to compound the error. When the pipeline reaches the broken line 79, the drive unit A is somewhat lateral of its original position. However, disconnecting the pipe from rotation with the mover and pushing the drive unit rearwardly merely compounds this error. With the applicant's arrangement, the drive unit A serves as the fulcrum point at all times so that when the pipe is returned to a position parallel to its original position, the drive unit is substantially aligned with its original position.

In actual practice, it has been found that the pipe may be moved accurately across a field if the operator is alert and watchful of the position of the free end of the sprinkler pipe. Oftentimes the free end of the pipe is provided with some sort of marker so that its position may be seen even from a considerable distance. As soon as the free end of the pipe moves a little ahead of, or a little behind, the position of the drive unit, the operator merely raises the drive wheels off the ground, and permits the pipe to rotate until the situation is corrected. With this arrangement, an operator using ordinary caution and care can cause the sprinkler system to move squarely across the field so that the parallel wheels travel in the same path with a minimum of injury to the crops being irrigated.

FIGURE 12 of the drawings also indicates the manner in which the power drive unit may be returned to its proper path if allowed to move laterally. The broken line 81 indicates the path along which the power drive unit is intended to move. As indicated, the unit A is somewhat above the path 81. To correct the position of the unit A, the drive wheels are raised, and the pipe is driven forwardly from a position parallel to the broken line 82 to the curved position indicated in full lines in this figure. This action causes the unit A to move into alignment with the broken line 83. The drive wheels are lowered and the unit driven forward unit it reaches the path 81, at which time the line may be straightened out to move along the path 81.

In FIGURES 13 through 19 of the drawings, I disclose a modified form of construction which is indicated in general by the letter B. The power drive unit B is physically quite similar to the power mover unit A, but is driven in a somewhat similar fashion, and functions in a slightly different way. The unit B includes a platform 90 which includes a top panel 91, and parallel right angularly extending sides 92 extending downwardly therefrom. The platform unit 90 is supported by a pair of yokes or wheel-supporting frames 93 and 94 which pivotally support wheels 95 and 96 respectively on transverse axes 97 and 99. The wheels 95 and 96 are arranged in tandem relation on opposite sides of the platform 90.

A housing 100 is secured to the undersurface of the platform panel 91, and is desired to rotatably support a central pipe section 101 which extends transversely of the platform 90 and terminates in flanges 102 which are secured to similar flanges 103 on pipe sections 104. The pipe sections 104 support drive wheels 105 on opposite sides of the platform 90. Rotation of the drive wheels 105 acts to cause the power drive unit to move along the field, and also to rotate the pipe sections 104 which are connected in the manner which has been described to pipe sections 10.

An internal combustion engine 106 is secured to the platform panel 91, and the motor drive shaft 107 operates a pump 109 capable of developing hydraulic power. The yoke or wheel support 94 is provided at its inner end with a channel 98 having parallel flanges 108 which lie parallel to and inwardly of the sides 92 of the platform 90. Bolts 108 connect the yoke 94 to the sides 92 of the platform 90 to hold the yoke 94 in fixed relation to the platform. The opposite wheel-supporting frame or yoke 93 is similarly provided with a channel-shaped bracket 110 which fits between the sides 92 of the platform 90. The parallel sides 111 of the bracket 110 are pivotally connected to the panel sides 92 by a pivot bolt 112. A hydraulic cylinder 113 is pivotally secured to the undersurface of the platform panel 91 as indicated at 114, and the piston 115 in the cylinder 113 is connected by a connecting rod 116 to a pivot 117 on the bracket 110. The piston 115 in the cylinder 113 may be actuated to pivot the wheel support or yoke 93 in a counter-clockwise direction as viewed in FIGURE 15, or to return the yoke 93 to the position indicated.

A worm wheel or gear 119 is mounted upon the pipe section 101, and a worm gear 120 is supported upon a shaft 121 extending longitudinally of the platform 90, the shaft 121 being supported by the housing 100. A hydraulic motor 122 is mounted on the shaft 121. Upon operation of the motor 122, the motor may be selectively moved in either rotative direction in such a manner as to drive the worm wheel 119 in either a clockwise direction or a counter-clockwise direction.

The housing 100 is partially hollow and serves as a reservoir for hydraulic fluid. As is indicated in FIGURE 19 of the drawings, a pair of hydraulic valves 123 and 124 are provided for controlling the flow of fluid from the pump 109. FGURE 19 shows the valves in their center position in which the fluid is merely bypassed back to the reservoir. As indicated, a fluid line 125 extends from the pump to a pressure line 126 communicating with a bypass passage 127 in the valve 123 connected by the conduit 129 to the return line 130 which extends through the filter 131 to the reservoir or housing 100. Fluid under pressure also extends from the pressure line 125 through a second conduit 132 to a bypass 133 in the valve 124 which leads through a conduit 135 to the return line 130 leading through the filter 131 to the reservoir 100. Thus with the two valves in the position indicated in FIGURE 19 of the drawings, the fluid is merely being bypassed through the valves back to the reservoir.

When the handle 136 of the shaft 137 controlling the valve 123 is moved to the right from the position indicated, the pressure line 126 is connected to the conduit 139 leading to the left-hand end of the cylinder 113, the piston 115 is moved to the right. This action causes the wheel support or yoke 93 to pivot in a counter-clockwise direction about a pivot axis 112, moving the wheel 95 downwardly as viewed in FIGURE 14, and acting to raise the drive wheels 105 from the surface of the ground, as indicated by the line 140. When the piston 115 reaches the limit of its movement, the piston 115 may be locked by returning the valve 123 to its center position viewed in FIGURE 19. A pressure limit switch 141 is provided in a line 142 leading to the return line 130 to permit the bypass of fluid under pressure when the piston 115 reaches its extreme position. As long as the drive wheels 105 are held out of contact with the ground, the pipe section 101 may be rotated to move the pipe relative to the power moving unit. When it is desirable to return the drive wheels to the surface of the ground, the valve 123 may be moved to the left as viewed in FIGURE 19, the direction of flow through the valve being reversed to allow the return of the piston 115 to its normal position.

The valve 124 controls the flow of fluid to the motor 122. When the valve is in the position indicated, the fluid flowing into the valve is free to return through the return lines 135, and 130. When the handle 143 of the shaft 144 controlling the valve 124 is moved to the right from the position indicated, the fluid is free to flow from the pressure line 132 to the hydraulic motor 122 in a direction to move the motor in one rotative direction. When the handle 143 is moved to the left from the position indicated, the flow of fluid to the motor 122 will drive the motor in the opposite rotative direction. A pressure relief valve 145 is provided in a conduit 146 leading to the return line 130 so that if the pressure is excessive, the pressure may return to the reservoir through the filter 131.

Thus it may be seen that by the operation of two simple valves, the power mover unit B may be moved along the ground, or the drive wheels may be lifted from the surface of the ground, permitting the sprinkler line to continue rotation either in one direction or another. The raising of the drive wheels from the ground is controlled by the cylinder 113 which acts to swing the tandem wheels 95 and 96 slightly toward one another, thereby acting to raise the drive wheels 105. Thus while the drive wheels continue to rotate, they do not act to move the power unit.

In accordance with the patent statutes, I have described the principles of construction and operation of my improvement in crop planting seed device, and while I have endeavored to set forth the best embodiment thereof, I desire to have it understood that changes may be made without departing from the spirit of my invention.

I claim:

1. A mover unit for use in combination with an elongated sprinkler pipe including a series of pipe lengths coupled together, wheels concentric with said pipe at longitudinally spaced intervals and secured thereto for supporting said pipe, and longitudinally spaced sprinkler heads secured to said pipe and communication with the interior thereof, the mover unit including:

a pipe section adapted to be coupled to said sprinkler pipe, a pair of drive wheels secured concentrically to said pipe sectio nin axailly spaced relation, a platform supported by said pipe section intermediate said drive wheels between said drive wheels, a pair of wheel supporting frames pivotally supported to said platform on pivots parallel to the pipe section axis on opposite sides of said pipe section, guide wheels supported in tandem relation to said wheel supporting frames, a power source on said platform, means connecting said power source to said pipe section to rotate said pipe section and said drive wheels selectively in either direction, means for raising the said drive wheels from the surface of the ground while said guide wheels are in ground engagement whereby, rotation of said pipe section may rotate said pipe without moving said mover unit.

2. The structure of claim 1 and in which said means for raising said drive wheels includes means for moving said guide wheels toward one another.

3. The structure of claim 1 and in which said means for raising said drive wheels includes means actuated by rotation of said pipe section.

4. The structure of claim 1 and in which said means for raising said drive wheels includes a brake element encircling said pipe section, links connecting said brake element with said wheel supporting frames, and means for tightening said brake element about said brake section whereby rotation of said pipe section acts to decrease the distance between said guide wheels.

5. The structure of claim 4 and in which said links are connected to said wheel suporting frames with limited slidable movement, whereby said guide wheels may follow the contour of the ground.

6. The structure of claim 4 and including fixed means on said platform for lifting pivotal movement of said brake element relative to said platform.

7. The structure of claim 1 and in which said means for raising said drive wheels includes means engageable into the ground to lift the drive wheels from contact therewith.

8. The structure of claim 4 and in which said brake element includes a pair of pivotally connected brake shoes, said links being pivotally connected at the point connecting between said shoes, and in which said tightening means comprises means for drawing said shoes together.

9. A mover unit for use in combination with an elongated sprinkler pipe including a series of pipe lengths coupled together, wheels concentric with said pipe at longitudinally spaced intervals and secured thereto for supporting said pipe, and longitudinally spaced sprinkler heads secured to said pipe and communicating with the interior thereof, the mover unit including:
- a pipe section adapted to be coupled to said sprinkler pipe,
- a pair of drive wheels secured concentrically to said pipe section in axially spaced relation,
- a platform supported by said pipe section intermediate said drive wheels between said drive wheels,
- a pair of wheel supporting frames secured to said platform to extend therefrom in a plane substantially normal to the axes of said drive wheels, at least one of said wheel supporting frames being pivotally supported on a point parallel to the drive wheel axes,
- guide wheels supported in tandem relation to said wheel supporting frames,
- a power source on said platform,
- means connecting said power source to said pipe section to rotate said pipe section and said drive wheels selectively in either direction,
- means for pivoting said pivotally supported wheel supporting frame relative to said platform to raise said drive wheels from the surface of the ground whereby,
- rotation of said pipe section may rotate said pipe without moving said mover unit.

10. The structure of claim 9 and in which said pivoting means comprises a cylinder and piston device connected between said pivotally supported wheel supporting frame and said platform.

References Cited

UNITED STATES PATENTS 3,385,315   5/1968   Decoto et al. _____ 239—212 X

STANLEY H. TOLLBERG, Primary Examiner